(12) United States Patent
Teleshov et al.

(10) Patent No.: US 7,566,407 B2
(45) Date of Patent: Jul. 28, 2009

(54) METHOD OF LIQUID-CRYSTAL POLYMER FILM PRODUCTION

(75) Inventors: Eduard Nikanorovich Teleshov, Bakinskikh Komissarov (RU); Igor Efimovich Kardash, Malaya Bronnaya (RU); Anna Igorevna Kardash, legal representative, Malaya Bronnaya (RU); Karen Andranikovich Mailyan, Malaya Naberejnaya (RU); Sergey Nikolaevich Chvalun, Baltijskaya (RU); Andrey Vladimirovich Pebalk, Prospect Vernadskogo (RU)

(73) Assignee: Samsung Electronics Co., Ltd. (KR)

( * ) Notice: Subject to any disclaimer, the term of this patent is extended or adjusted under 35 U.S.C. 154(b) by 629 days.

(21) Appl. No.: 11/260,593

(22) Filed: Oct. 27, 2005

(65) Prior Publication Data

US 2006/0113507 A1    Jun. 1, 2006

(30) Foreign Application Priority Data

Oct. 28, 2004  (RU) .............................. 2004131492

(51) Int. Cl.
*C09K 19/00* (2006.01)
*C09K 19/06* (2006.01)
*C09K 19/52* (2006.01)

(52) U.S. Cl. .............................. 252/299.01; 252/299.4; 252/299.62; 430/20; 428/1.1; 428/1.2

(58) Field of Classification Search ............ 252/299.01, 252/299.4, 299.62; 428/1.1, 1.2; 430/20
See application file for complete search history.

(56) References Cited

U.S. PATENT DOCUMENTS

| 3,342,754 | A | 9/1967 | Gorham .......................... 260/2 |
| 3,830,733 | A | 8/1974 | Spivack et al. | |
| 4,038,439 | A | 7/1977 | Gibson et al. ................. 427/38 |
| 4,781,439 | A | 11/1988 | Yokokura et al. ........... 350/341 |
| 5,177,475 | A | 1/1993 | Stephany et al. ............ 340/784 |
| 6,094,251 | A | 7/2000 | Jones et al. .................. 349/172 |
| 6,219,123 | B1 | 4/2001 | Naito et al. .................. 349/126 |
| 6,639,646 | B2 | 10/2003 | Lim ........................... 349/187 |
| 6,946,405 | B2 * | 9/2005 | Takahashi et al. ........... 438/780 |

FOREIGN PATENT DOCUMENTS

| RU | 2017186 | 7/1994 |
| RU | 2055384 | 2/1996 |
| RU | 2073902 | 2/1997 |
| RU | 2082209 | 6/1997 |
| RU | 2215770 | 11/2003 |

OTHER PUBLICATIONS

The Encyclopedia of Polymers; Moscow, "Soviet Encyclopedia" Publisher, 1974. vol. 2, p. 871.
Description of Invention to the Author's Certificate; SU1151546 A; Vilesova M. S.; Guryshev V.N.; Mukhin V.E.; Karpycheva I.N.; Ilin Yu. A.; Filatova G. I.; Date: Apr. 23, 1985; Bulletin No. 15.

* cited by examiner

*Primary Examiner*—Geraldina Visconti
(74) *Attorney, Agent, or Firm*—Cantor Colburn LLP

(57) ABSTRACT

The invention relates to the production of liquid-crystal films and coatings from substituted poly-para-xylylenes to be used as alignment layers in different electrooptical devices (alpha-meric indicators, displays, optical shutters, etc.). Particularly, the invention is directed to a one-step method for producing a liquid-crystal polymer film of the substituted poly-para-xylylene, said film simultaneously exhibiting the orienting properties with respect to LC molecules. The essence of a claimed method is in production of films and coatings from the substituted poly-para-xylylene by means of the successive execution in vacuum of sublimation at 0-350° C. and pyrolysis at 450-700° C. of the substituted cyclic di-para-xylylene in which substituent groups have terminal mesogenic groups, and condensation of the pyrolysis-generated substituted para-xylylene simultaneously with its polymerization on a substrate at 150-320° C. The process is performed at a predetermined film formation rate on the substrate surface. Produced are liquid-crystal polymer materials which films are good orientants with respect to LC molecules.

13 Claims, No Drawings

METHOD OF LIQUID-CRYSTAL POLYMER FILM PRODUCTION

THE FIELD OF THE INVENTION

The invention relates to the chemical industry, and particularly, to the production of polymer materials (films, coatings), especially poly-para-xylylene films and coatings, and more especially, it relates to the production of liquid-crystal films and coatings of substituted poly-para-xylylenes which are used as alignment layers in different electrooptical devices (alphameric indicators, displays, optical shutters, etc.).

In this invention, the term "film" means both unsupported films and films supported by or applied onto a substrate, for example, coatings and layers, and also films arranged between the substrates, for example, layers and others.

BACKGROUND OF THE INVENTION

A flat sandwich-type cell filled with liquid crystals (LC) is the main element of electrooptical devices. One or another electrooptical effect is displayed in the flat cells depending on an initial orientation of the LC molecules. A way of distribution of the LC molecules inside the cell over the surface of the support substrates depends, for the first, on the properties of mesophase itself (nematic, cholesteric, or smectic) and, for the second, on the orienting properties of the surface of the support substrate. As a rule, the initial orientation of the LC molecules is a parallel (planar) one or a perpendicular (homeotropic) one. In the first case, axis of the LC molecules are parallel to the support substrate, and in the second case they are perpendicular to the support substrate.

Thin alignment layers for which different polymer materials are used (polyamides, polyimides, polyvinyl alcohol, polyesterketones, siloxanes, etc.) have been applied on the surfaces of the support substrates to render the orienting properties thereto.

The Russian Patent No. RU 2,082,209 of Jun. 20, 1997 discloses the use of polyvinyl alcohol films as an alignment layer (orientant) in the LC cells designed to prevent blinding during operation with bright light sources.

The Russian Patent No. RU 2,017,186 of Jul. 30, 1994 discloses the use of a polyimide film as an orientant in the LC displays.

The technology of LC cells production includes a high-temperature step of sealing the cells. Their operation is often performed in the aggressive atmosphere and high humidity conditions. Therefore, the use of the widely known polymer materials as orientants in some cases is restricted by their low chemical and thermal resistance, hydrolytic stability.

Polyimide films which are known by their high thermal resistance have been recently used as orientants. As a rule, a film of polyamidoacid is firstly applied from a solution onto a substrate by the centrifugation method, and then its imidization is performed at a high temperature, for example, at 300° C. (see the U.S. Pat. No. 4,781,439 of Nov. 1, 1988 and U.S. Pat. No. 6,639,646 of Oct. 28, 2003).

The U.S. Pat. No. 6,094,251 of Jul. 25, 2000 discloses the use of polyimides and polyamides ("Probimide 32" by Ciba-Geigy company and polymers SE130, SE7311, SE4110 and SE610 by Nissan company) as the orientants. In order to change the alignment properties of the applied orientants, their thermal treatment was performed. One layer was heated at a temperature of less than 180° C. within half an hour, and the other at a temperature of about 300° C. for 1-3 hours.

In order to render new properties to the polymer orientants, their chemical modification is also possible. For example, a polyimide film is exposed to radicals of fluorocarbons in a high-frequency plasma with a power of 30-300 mW/cm$^2$ for 10-100 seconds, thereby a controlled increase in pre-inclination angles of the liquid crystal director is achieved (see the Russian Patent No. RU 2,055,384 of Feb. 27, 1996).

When a polymer alignment layer is formed from a solution, a necessary step is its solidification or drying, which significantly extends the duration of technological cycle for the manufacture of electrooptical devices.

The polymer orientants are applied onto the surface of the support substrates from solutions by different methods such as centrifugation, dipping, spraying by an atomizer, coating through a slotted nozzle. The technology of electrooptical device manufacture makes quite strict demands on the alignment layer formation method: high continuity, uniformity, and possibility to adjust the thickness on the surfaces of great dimensions. The known alignment layer formation methods have some essential disadvantages: the centrifugation method can not be applied to deposit uniform coatings on the plates of great dimensions due to significant difference in linear velocities of different areas of the plate; the spraying by an atomizer does not allow to obtain high uniformity in thin layers, requires a significant material consumption, and is uneconomical; the coating through a slotted nozzle (spinneret) does not allow to obtain uniform thin films.

As a rule, polymer layers applied onto the support substrates from the solutions do not exhibit a sufficient orienting effect in relation to the LC molecules. There are different methods to render the orienting properties to the surface of the polymer.

A method of mechanical texturing (rubbing) of the surface is widely used. The essence of this method is in rubbing of the film surface in one direction by means of a roller covered by a pile cloth having short polymer fibres (for example, viscose, polyesters, nylon, etc.). An example of the mechanical method for rendering the orienting properties to a polyimide film is disclosed in the U.S. Pat. No. 6,219,123 of Apr. 17, 2001.

The mechanical method by rubbing of aligning films has some essential disadvantages: generation of dust particles on the surface of the films; appearance, on the surface of the films, of static electric charges which discharge may result in damage of thin-film transistors; impossibility to keep strictly the predetermined direction of fibres, which leads to non-reproducibility of the obtained results and, therefore, to high percentage of faulty production; incompatibility of this method with the conditions of clean rooms in which the process operations to assemble the LC devices (indicators, displays, etc.) are performed.

In case of the polymers produced by vapor deposition onto the substrates, for example, by polymerization in plasma, a structure which is inherently an orientant for the LC molecules is generated at once during the polymer layer formation process. Thus, there is no need in any process step of mechanical rubbing.

In the U.S. Pat. No. 4,038,439 of Jul. 26, 1977, in order to obtain the perpendicular orientation of LC molecules, polished glass substrates are kept in a flow of free fluorocarbon radicals that are generated by decomposition, in plasma, of polyfluorinated compounds, preferably tetrafluoroethylene. A thickness of the polyfluorinated orientants is 100 to 500 Å, and a deposition rate is 2 to 5 Å/min.

The Russian Patent No. RU 2,073,902 of Feb. 20, 1997 proposes a method for unidirectional orientation of liquid crystals by means of the surface of substrates by deposition of a plasma-polymerized material, wherein the support substrates of LC cells are placed inclined in the plasma formation region with respect to electrodes of the diode system, and a glow-discharge plasma containing hydrocarbon radicals is generated.

It is known that the plasma polymerization processes do not allow us to produce polymer films of a stable and predetermined chemical composition. As the result, it is difficult to get a reproducible homogeneous orientation of the LC molecules, what is the main disadvantage of the formation of orientant layers by the plasma polymerization method. Moreover, the produced layers have poor mechanical properties and can be destroyed in the period of electrooptical devices operation.

Known is a method for producing films and coatings of substituted and unsubstituted poly-para-xylylenes by pyrolysis of a cyclic di-para-xylylene ([2.2]-para-cyclophane) or a corresponding substituted derivative thereof (The Encyclopedia of polymers, Moscow, "Soviet Encyclopedia" Publisher, 1974, vol. 2, page 871). The cyclic di-para-xylylene is subjected to pyrolysis at 600° C. in vacuum having a pressure of less than 133.322 n/m$^2$ (less than 1 mm of mercury). Vapors of the para-xylylene generated thereby react by polyrecombination during deposition of said vapors on any surface to produce a film, wherein the polymer yield is a quantity one. This method can be used to deposit the poly-para-xylylene films (with a thickness of from 20 nm to 250 μm) on articles of various cross-sections. For this purpose, the articles are placed in a condensation chamber which is directly connected to a pyrolitic tube.

The U.S. Pat. No. 5,177,475 of Jan. 5, 1993 proposes to use poly-para-xylylene as an alignment layer for LC devices, wherein poly-para-xylylene simultaneously acts as a blocking layer for the direct current (DC) in such devices. In the specification to this patent, poly-para-xylylene is referred to as Parylene, i.e. a trade name for a family of polymers (poly-para-xylylenes) developed by Union Carbide Corporation, USA. The main representative of such family is an unsubstituted poly-para-xylylene which has a trade name of Parylene N and which is a linear highly-crystalline material. As the consequence of unique nature of the vapor deposition process, the parylene polymers can be produced as structurally-continuous films having a thickness of from fractions of a micron up to tens of microns. It is mentioned in the specification to this patent that the Parylene film production process is very well known, and that is why this process is nowhere disclosed therein. According to this patent, it is preferable to use the unsubstituted poly-para-xylylene (Parylene N) as a polymer orientant, though it is also possible to use other Parylenes.

There are various well-known methods (see the U.S. Pat. No. 3,830,733 of Aug. 20, 1974; the USSR Author's Certificate No. SU 1,151,546 of Apr. 23, 1985) for production of films and coatings from poly-para-xylylene or substituted derivatives thereof by sequential execution, in vacuum in a three-zone reactor which consists of a sublimation zone, a pyrolysis zone, and a condensation zone, of sublimation, pyrolysis of a cyclic di-para-xylylene or substituted derivatives thereof and condensation of the pyrolysis products on a substrate simultaneously with their polymerization.

However, these known methods do not allow to fabricate poly-para-xylylene films possessing the orienting properties with respect to the LC molecules in a single process step. For example, it is stated in the Russian Patent No. RU 2,215,770 of Nov. 10, 2003 that a poly-para-xylylene film used for encapsulation of the LC molecules does not provide a controllable orienting action.

A prior art closest to the clamed invention is a method (see the U.S. Pat. No. 3,342,754 of Sep. 19, 1967) for production of linear homopolymers of poly-para-xylylene or substituted derivatives thereof by sequential execution, in vacuum in a three-zone reactor consisting of a sublimation zone, a pyrolysis zone, and a condensation zone, of sublimation, pyrolysis of a cyclic di-para-xylylene or substituted derivatives thereof and condensation of the pyrolysis products on a substrate simultaneously with their polymerization to produce a polymer layer.

According to this method, the pyrolysis step is performed at a temperature between 450 and 700° C., and the condensation and simultaneous polymerization are performed at a temperature of less than 200° C., depending on the used cyclic di-para-xylylene ([2.2]-para-cyclophane); a residual pressure in the system is kept in the interval between 0.0001 and 10 mm of mercury; and a partial pressure of vapors of p-xylylene biradicals is kept below 0.75 mm of mercury. A molecular of the cyclic di-para-xylylene according to this method can contain up to 6 substituent groups in aromatic rings, wherein the substituent groups can be as follows: various hydrocarbons, oxyhydrocarbons, thiohydrocarbons, hydroxyls, halogens, nitro groups, nitrile groups, amino groups, and mercapto groups. Produced by this method is a linear, non-cross-linked, thermoplastic polymer product completely soluble in solvents without molecular destruction processes being occurred, and the melting of its crystalline phase is in a narrow temperature range. The polymer product is obtained as a homogeneous coating on the substrate surface.

DISCLOSURE OF THE INVENTION

A technical object of the present invention is to provide a one-step method for producing a liquid-crystal polymer film of a substituted poly-para-xylylene, said film simultaneously exhibiting orienting properties with respect to LC molecules.

This technical object is solved by a one-step method according to the present invention for producing a liquid-crystal polymer film of a substituted poly-para-xylylene, which film is simultaneously an orientant (alignment layer) for molecules of liquid-crystals (LC molecules).

The essence of the invention is as follows: sublimation and pyrolysis of a substituted cyclic di-para-xylylene ([2.2]-para-cyclophane) are successively performed in vacuum in a three-zone reactor which consists of a sublimation zone, a pyrolysis zone and a condensation zone, at a temperature of 450 to 700° C. followed by condensation and simultaneous polymerization of the produced substituted para-xylylene on a substrate to form a film of the substituted poly-para-xylylene. The claimed method differs from the known one in that a residual pressure in the system is 0.000001 to 0.5 mm of mercury, the sublimation is performed at a temperature of 0 to 350° C., preferably at a temperature of 15 to 100° C., the condensation and simultaneous polymerization are performed at a temperature of 150 to 320° C., preferably at a temperature of 210 to 290° C., wherein the process is performed at a film formation rate during the polymerization of 0.0001 to 0.01 μm/min (microns per minute), and substituent groups in the substituted cyclic di-para-xylylene have terminal mesogenic groups. According to the claimed method, the substituted cyclic di-para-xylylene comprises not more than 2 substituent groups ($R_X$ and $R_Y$) in aromatic rings, wherein the substituent groups include junction groups by which the substituent groups themselves are connected to the aromatic rings of the substituted cyclic di-para-xylylene, and terminal mesogenic groups:

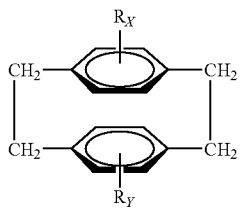

where $x+y \leq 2$; at $x=0$, $R_X=H$, $y=1$ or $y=2$; at $y=0$, $R_Y=H$, $x=1$ or $x=2$; at $x=y=1$, $R_X$ and $R_Y$ are the same substituent groups.

The junction groups are alkylene groups:

$$-(CH_2)_m-$$

where $m=3$ to 8;

or oxyalkylene groups (type of oligoglycols):

$$-(CH_2)_x-O-(CH_2)_y-O-.$$

The terminal mesogenic groups are as follows:

derivatives of p-hydroxybenzoic acid, mainly esters of the type:

$-O-Ar-COO-Ar-X$, where $X=H$, $-C_mH_{2m+1}$, $-OC_mH_{2m+1}$, and others ($m=2, 3, 4$);

p-biphenyl compounds of the type:

$-Ar-Ar-X$, where $X=H$, $-C_mH_{2m+1}$, $-OC_mH_{2m+1}$, CN, and others ($m=2, 3, 4$);

p-azomethines possibly containing substituents in the para position of the type:

$-Ar-N=CH-Ar-X$, where $X=H$, $-C_mH_{2m+1}$, $-OC_mH_{2m+1}$, and others ($m=2, 3, 4$);

derivatives of azobenzene of the type:

$-Ar-N=N-Ar-X$, where $X=H$, $-C_mH_{2m+1}$, $-OC_mH_{2m+1}$, and others ($m=2, 3, 4$);

possible combinations of these fragments.

The substituted poly-para-xylylenes produced by this method are liquid-crystal polymers, and their films are characterized by superior orienting properties in relation to the LC molecules.

The X-ray diffraction analysis and thermo-physical analysis performed by the present inventors have demonstrated that films of the substituted poly-para-xylylenes are partially crystalline at room temperature. If the temperature is increased up to 250-350° C., a transition into the liquid-crystal state is observed. The X-ray data corresponds to an identity period of the produced substituted poly-para-xylylenes, which is equal to 6.5-6.6 Å. An observed intensive reflex corresponding to an interchain distance depends on the length of a pendent substituent and is varied in the range of 12 to 28 Å. According to these results, the films of the substituted poly-para-xylylene are characterized by a strong planar texture with an axis of macromolecules arranged in parallel to the substrate plane, wherein the rigid mesogenic terminal groups (pendent substituents) are in the same plane. A degree of orientation depends on the process conditions: at some conditions, this degree is maximal and achieves, in some cases, an orientation factor of 0.95. An obvious effect gives the nature of the employed substrate, and the higher is an interaction between the substrate material and the growing polymer film, the better said planar texture is expressed.

It has been experimentally determined by the present inventors that, in order to implement the present invention in practice, it is necessary that the residual pressure in the system to be in the range of 0.000001 to 0.5 mm of mercury; the sublimation temperature to be in the range of 0 to 350° C., preferably 15 to 100° C.; the temperature of condensation and simultaneous polymerization to be in the range of 150 to 320° C., preferably 210 to 290° C.; and the film formation rate during the polymerization to be in the range of 0.0001 to 0.01 µm/min. It is also necessary that, in the substituted cyclic di-para-xylylene, the substituent groups in the aromatic rings to have terminal mesogenic groups and that a quantity of said mesogenic groups to be not more than 2. During the pyrolysis of the substituted cyclic di-para-xylylene, the substituted para-xylylene (monomer) is formed, which monomer polymerizes simultaneously with the condensation on the substrate to form a film of the substituted poly-para-xylylene. During the polymerization, a crystallization of the growing chains and an orientation of the pendent mesogenic groups relative to the substrate plane and relative to each other take place. Evidently, a needed balance between the condensation (absorption) rate of the substituted para-xylylene on the substrate where the polymer film is formed, the predetermined spatial orientation of the molecule of the substituted para-xylylene relative to the substrate plane and of the terminal mesogenic groups of the adjacent molecules relative to one other, and a polymerization rate of the substituted para-xylylene and a crystallization rate of the generating polymer chains is fulfilled when the process of polymerization on the substrate from the gas phase (vapor) is carried out in the inventors' identified ranges of the residual pressure in the system, the sublimation temperature, the temperature of condensation and simultaneous polymerization and the film formation rate during polymerization. Such a balance according to the present invention results in the formation of liquid-crystal substituted poly-para-xylylene that is an orientant for the LC molecules.

When the residual pressure in the system is less than 0.000001 mm of mercury, it is not possible to produce a continuous polymer layer on the substrate, and this is, possibly, the result of a change in the film growth mechanism to the "island" type growth. If the process is performed at the residual pressure in the system of more than 0.5 mm of mercury, there exists an off-orientation of the pendent substituent groups having the terminal mesogenic groups relative to each other along the molecular chain of the substituted poly-para-xylylene, between the neighbor chains and relative to the substrate plane. As the result, their liquid-crystal order is lost, and the formed film is no longer an orientant for the LC molecules. A similar effect is observed at the relatively high (more than 0.01 µm/min) rates of film growth during the polymerization.

At the very low film formation rates (less than 0.0001 µm/min), a duration of the alignment layer production step is significantly increased, and this makes the method according to the present invention economically disadvantageous.

At the sublimation temperature below 0° C., a transfer of the substituted cyclic di-para-xylylene to the gas phase does not practically occur, and therefore it is impossible to implement in practice the film formation process of the substituted poly-para-xylylene. At the sublimation temperature above 350° C., an "overshoot" of the cyclic dimer through the pyrolysis zone occurs very intensively, and its content in the generating film is too high, and therefore the formation of the polymer film having the above described properties is unlikely.

As it has been experimentally found out by the inventors, the polymerization of the examined substituted cyclic di-para-xylylenes at the temperatures of less than 150° C. results in the production of a non-textured polymer, without a well-expressed liquid-crystal phase. As the result, the produced polymer layers cannot act as orientants for the LC molecules.

The polymerization temperature of 320° C. seems to be a maximum condensation temperature for the examined substituted para-xylylenes: practically no polymerization occurs on the substrate above this temperature.

PREFERABLE EMBODIMENTS OF THE INVENTION

The following examples illustrate the present invention in more details, but without providing any limitations thereto.

EXAMPLE 1

Di(4-methyleneoxy-4'-cyanobiphenyl)-[2.2]-para-cyclophane, i.e. a monomer for the synthesis of poly(4-methyleneoxy-4'-cyanobiphenyl-para-xylylene), was placed into a cuvette inside a sublimation zone of a coating deposition apparatus. The coating deposition apparatus was evacuated to a residual pressure of 0.0001 mm of mercury. The cuvette was heated to 60° C., and the di(4-methyleneoxy-4'-cyanobiphenyl)-[2.2]-para-cyclophane was evaporated and was transferred from the sublimation zone into the pyrolysis zone which has been heated to 630° C. The di(4-methyleneoxy-4'-cyanobiphenyl)-[2.2]-para-cyclophane was disintegrated (decomposed) in the pyrolysis zone, thereby generating a highly reactive intermediate in the form of (4-methyleneoxy-4'-cyanobiphenyl)-para-xylylene. This intermediate in the form of (4-methyleneoxy-4'-cyanobiphenyl)-para-xylylene was condensed on a polished glass substrate having dimensions of 50×50 mm at 255° C. to form a film of poly((4-methyleneoxy-4'-cyanobiphenyl)-para-xylylene). A film formation rate during the polymerization was 0.0064 μm/min. After the process was finished, the substrate having the polymer film deposited thereon was cooled to room temperature, then the pressure in the apparatus was increased to the atmospheric pressure, and the substrate was removed from the polymerization reactor. A layer of a liquid-crystal mixture based on alkylcyanobiphenyls was applied onto the substrate over the orienting polymer coating. Optical polarization microscopy data and data for the determination of an inclination angle of the axis of molecules to the substrate plane have demonstrated that the molecules of liquid crystals (LCs) having the positive dielectric anisotropy are oriented on the substrate surface in parallel and unidirectionally, with the inclination angle of 0 to 1.5°.

EXAMPLE 2

Di(4-methyleneoxy-4'-cyanobiphenyl)-[2.2]-para-cyclophane, i.e. a monomer for the synthesis of poly(4-methyleneoxy-4'-cyanobiphenyl-para-xylylene), was placed into a cuvette inside the sublimation zone. The coating deposition apparatus was evacuated to a residual pressure of 0.00004 mm of mercury. The cuvette was heated to 45° C., and the di(4-methyleneoxy-4'-cyanobiphenyl)-[2.2]-para-cyclophane was evaporated and was transferred from the sublimation zone into the pyrolysis zone which has been heated to 600° C. The di(4-methyleneoxy-4'-cyanobiphenyl)-[2.2]-para-cyclophane was disintegrated in the pyrolysis zone, thereby generating a highly reactive intermediate in the form of (4-methyleneoxy-4'-cyanobiphenyl)-para-xylylene. This intermediate in the form of (4-methyleneoxy-4'-cyanobiphenyl)-para-xylylene was condensed on a polished glass substrate having dimensions of 50×50 mm at 275° C. to form a film of poly((4-methyleneoxy-4'-cyanobiphenyl)-para-xylylene). A film formation rate during the polymerization was 0.0018 μm/min. After the process was finished, the substrate having the polymer film deposited thereon was cooled to room temperature, then the pressure in the apparatus was increased to the atmospheric pressure, and the substrate was removed from the polymerization reactor. A layer of a liquid-crystal mixture based on alkylcyanobiphenyls was applied onto the substrate over the orienting polymer coating. Optical polarization microscopy data and data for the determination of an inclination angle of the axis of molecules to the substrate plane have demonstrated that the molecules of LCs having the positive dielectric anisotropy are oriented on the substrate surface in parallel and unidirectionally, with the inclination angle of 0 to 1.5°.

EXAMPLE 3

Di(4-methyleneoxy-4'-cyanobiphenyl)-[2.2]-para-cyclophane, i.e. a monomer for the synthesis of poly(4-methyleneoxy-4'-cyanobiphenyl-para-xylylene), was placed in a cuvette inside the sublimation zone. The coating deposition apparatus was evacuated to a residual pressure of 0.000001 mm of mercury. The di(4-methyleneoxy-4'-cyanobiphenyl)-[2.2]-para-cyclophane from the cuvette in the sublimation zone at 0° C. was transferred into the pyrolysis zone which has been heated to 540° C. The di(4-methyleneoxy-4'-cyanobiphenyl)-[2.2]-para-cyclophane was disintegrated in the pyrolysis zone, thereby generating a highly reactive intermediate in the form of (4-methyleneoxy-4'-cyanobiphenyl)-para-xylylene. This intermediate in the form of (4-methyleneoxy-4'-cyanobiphenyl)-para-xylylene was condensed on a polished glass substrate having dimensions of 50×50 mm at 320° C. to form a film of poly((4-methyleneoxy-4'-cyanobiphenyl)-para-xylylene). A film formation rate during the polymerization was 0.0001 μm/min. After the process was finished, the substrate having the polymer film deposited thereon was cooled to room temperature, then the pressure in the apparatus was increased to the atmospheric pressure, and the substrate was removed from the polymerization reactor. A layer of a liquid-crystal mixture based on alkylcyanobiphenyls was applied onto the substrate over the orienting polymer coating. Optical polarization microscopy data and data for the determination of an inclination angle of the axis of molecules to the substrate plane have demonstrated that the molecules of LCs having the positive dielectric anisotropy are oriented on the substrate surface in parallel and unidirectionally, with the inclination angle of 0 to 1.8°.

EXAMPLE 4

Di(4-methyleneoxy-4'-cyanobiphenyl)-[2.2]-para-cyclophane, i.e. a monomer for the synthesis of poly(4-methyleneoxy-4'-cyanobiphenyl-para-xylylene), was placed in a cuvette inside the sublimation zone. The coating deposition apparatus was evacuated to a residual pressure of 0.5 mm of mercury. The cuvette was heated to 350° C., and the di(4-methyleneoxy-4'-cyanobiphenyl)-[2.2]-para-cyclophane was evaporated and was transferred from the sublimation zone into the pyrolysis zone which has been heated to 700° C. The di(4-methyleneoxy-4'-cyanobiphenyl)-[2.2]-para-cyclophane was disintegrated in the pyrolysis zone, thereby generating a highly reactive intermediate in the form of (4-methyleneoxy-4'-cyanobiphenyl)-para-xylylene. This intermediate in the form of (4-methyleneoxy-4'-cyanobiphenyl)-para-xylylene was condensed on a polished glass substrate having dimensions of 50×50 mm at 180° C. to form a film of poly((4-methyleneoxy-4'-cyanobiphenyl)-para-xylylene). A film formation rate during the polymerization was 0.01 μm/min. After the process was finished, the substrate having the polymer film deposited thereon was cooled to room temperature, then the pressure in the apparatus was increased to the atmospheric pressure, and the substrate was removed from the polymerization reactor. A layer of a liquid-crystal mixture based on alkylcyanobiphenyls was applied onto the substrate over the orienting polymer coating. Optical polarization microscopy data and data for the determination of an inclination angle of the axis of molecules to the substrate plane have demonstrated that the molecules of LCs having the positive dielectric anisotropy are oriented on the substrate surface in parallel and unidirectionally, with the inclination angle of 0 to 1.8°.

What is claimed is:

1. A method for producing a liquid-crystal polymer film comprising:
    (a) sublimating a substituted di-para-xylylene having at least one mesogenic group at a temperature of 0° C. to 350° C.
    (b) pyrolysing the di-para-xylylene to form a substituted para-xylylene; and
    (c) condensing and polymerizing the substituted para-xylylene at a temperature of 150° C. to 320° C. to form a film made of a substituted poly-para-xylylene on a substrate.

2. The method of claim 1, wherein the substituted di-para-xylylene comprises not more than 2 substituent groups in aromatic rings, wherein the substituent groups include junction groups by which the substituent groups themselves are connected to the aromatic rings, and mesogenic groups.

3. The method of claim 2, the substituted di-para-xylylene is represented by formula (I):

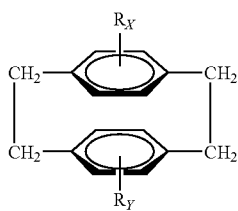

(I)

wherein x+y≦2; $R_x$=H, y =1 or 2 when x=0; $R_y$=H, x=1 or 2 when y=0; $R_x$ and $R_y$ is same when x=y=1.

4. The method of claim 2, the mesogenic groups are one selected from among the following groups:
    (a) derivatives of p-hydroxybenzoic acid, of the formula:

—O—Ar—COO—Ar—X, wherein X =H, —$C_mH_{2m+1}$, —$OC_mH_{2m+1}$, and others (m =2, 3, 4);
    (b) p-biphenylic compounds of the formula:

—Ar—Ar—X, wherein X =H, —$C_mH_{2m+1}$, —$OC_mH_{2m+1}$, CN, and others (m =2, 3, 4);
    (c) p-azomethines optionally containing substituents in the para position, of the formula:

—Ar—N=CH—Ar—X, wherein X =H, —$C_mH_{2m+1}$, —$OC_mH_{2m+1}$, and others (m =2, 3, 4);
    (d) derivatives of azobenzene of the formula:

—Ar—N=N—Ar—X, wherein X =H, —$C_mH_{2m+1}$, —$OC_mH_{2m+1}$, and others (m =2, 3, 4); and
    (e) combinations of these fragments.

5. The method of claim 2, the junction groups are one selected from formula (II) or (III):

—(CH$_2$)$_m$— (II)

wherein m =3 to 8;

—(CH$_2$)$_x$—O—(CH$_2$)$_y$—O— (III)

6. The method of claim 1, wherein the step (a) is performed at a temperature of 15° C. to 100° C.

7. The method of claim 1, wherein the step (c) is performed at a temperature of 210° C. to 290° C.

8. The method of claim 1, wherein the step (a) to (c) is performed at a residual pressure in a system of 0.000001 to 0.5 mmHg.

9. The method of claim 1, wherein the substituted poly-para-xylylene in the step (c) is polymerized at a velocity of 0.0001-0.01 µm/min.

10. The method of claim 1, wherein the film has a thickness of 20 nm to 10 µm.

11. The method of claim 1, wherein the film is used as alignment layer for aligning liquid-crystal molecules.

12. A liquid-crystal polymer film produced from cyclic di-para-xylylene, wherein the cyclic di-para-xylylene comprises not more than 2 substituent groups in aromatic rings, wherein the substituent groups include junction groups by which the substituent groups themselves are connected to the aromatic rings, and mesogenic groups, wherein the mesogenic groups are one selected from among the following groups:
    (a) derivatives of p-hydroxybenzoic acid, of the formula:

—O—Ar—COO—Ar—X, wherein X =H, —$C_mH_{2m+1}$, —$OC_mH_{2m+1}$, and others (m =2, 3, 4);
    (b) p-biphenylic compounds of the formula:

—Ar—Ar—X, wherein X =H, —$C_mH_{2m+1}$, —$OC_mH_{2m+1}$, CN, and others (m =2, 3, 4);
    (c) p-azomethines, optionally containing substituents in the para position, of the formula:

—Ar—N=CH—Ar—X, wherein X =H, —$C_mH_{2m+1}$, —$OC_mH_{2m+1}$, and others (m =2, 3, 4);
    (d) derivatives of azobenzene of the formula:

—Ar—N=N—Ar—X, wherein X =H, —$C_mH_{2m+1}$, —$OC_mH_{2m+1}$, and others (m =2, 3, 4); and
    (e) combinations of these fragments.

13. A liquid-crystal polymer film comprising poly-para-xylylene derivatives, wherein the poly-para-xylylene derivatives have at least one mesogenic group selected from among the following groups:
    (a) derivatives of p-hydroxybenzoic acid, of the formula:

—O—Ar—COO—Ar—X, wherein X =H, —$C_mH_{2m+1}$, —$OC_mH_{2m+1}$, and others (m =2, 3, 4);

(b) p-biphenylic compounds of the formula:

—Ar—Ar—X, wherein X =H, —$C_mH_{2m+1}$, —$OC_mH_{2m+1}$, CN, and others (m =2, 3, 4);

(c) p-azomethines, optionally containing substituents in the para position, of the formula:

—Ar—N=CH—Ar—X, wherein X =H, —$C_mH_{2m+1}$, —$OC_mH_{2m+1}$, and others (m =2, 3, 4);

(d) derivatives of azobenzene of the formula:

—Ar—N=N—Ar—X, wherein X =H, —$C_mH_{2m+1}$, —$OC_mH_{2m+1}$, and others (m =2, 3, 4); and (e) combinations of these fragments.

* * * * *